(12) United States Patent
Chung et al.

(10) Patent No.: US 9,317,085 B2
(45) Date of Patent: Apr. 19, 2016

(54) ELECTRONIC DEVICE AND CLOCK RATES CONTROLLING METHOD OF OVERCLOCKING OPERATION

(71) Applicants: Ming-Hung Chung, Taipei (TW); Ji-Kuang Tan, Taipei (TW); Yu-Chen Lee, Taipei (TW)

(72) Inventors: Ming-Hung Chung, Taipei (TW); Ji-Kuang Tan, Taipei (TW); Yu-Chen Lee, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 299 days.

(21) Appl. No.: 13/939,196

(22) Filed: Jul. 11, 2013

(65) Prior Publication Data

US 2014/0122917 A1 May 1, 2014

(30) Foreign Application Priority Data

Nov. 1, 2012 (TW) ............... 101140581 A

(51) Int. Cl.
*G06F 1/08* (2006.01)
*G06F 1/20* (2006.01)
*G06F 1/32* (2006.01)

(52) U.S. Cl.
CPC ............... *G06F 1/206* (2013.01); *G06F 1/324* (2013.01); *Y02B 60/1217* (2013.01)

(58) Field of Classification Search
CPC ...... G06F 1/206; G06F 1/324; Y02B 60/1217
See application file for complete search history.

(56) References Cited

U.S. PATENT DOCUMENTS

| 7,134,030 | B2 * | 11/2006 | Wang | ............................. | 713/320 |
| 7,219,252 | B1 * | 5/2007 | Li et al. | ......................... | 713/501 |
| 7,469,355 | B1 * | 12/2008 | Chong | .......................... | 713/600 |
| 7,793,291 | B2 * | 9/2010 | Arai | ..................... | G05B 19/418 |
| | | | | | 712/228 |
| 8,412,969 | B2 * | 4/2013 | Hsiao | ........................... | 713/322 |
| 2004/0133816 | A1 * | 7/2004 | Miyairi | ................. | G06F 1/3203 |
| | | | | | 713/300 |
| 2004/0205371 | A1 | 10/2004 | Huang | | |
| 2007/0124609 | A1 | 5/2007 | Lee | | |

FOREIGN PATENT DOCUMENTS

CN 101251763 8/2008
TW 1256541 6/2006

* cited by examiner

*Primary Examiner* — Thuan Du
(74) *Attorney, Agent, or Firm* — Jianq Chyun IP Office

(57) ABSTRACT

An electronic device and a method for controlling over clocking of CPU are provided. A temperature sensing element is coupled with the CPU and used for sensing the temperature of the CPU. A control circuit is coupled with the temperature sensing element and the CPU used for determining whether the temperature of the CPU is higher than a first threshold temperature. When the temperature of the CPU is higher than the first threshold temperature, the control circuit controls the CPU to enter an idle mode and determines whether the temperature of the CPU is lower than a second threshold temperature. When the temperature of the CPU is lower than the second threshold temperature, the CPU is controlled to return to a normal mode. The first threshold temperature is higher than the second threshold temperature, and the clock rate of the CPU is maintained at same clock rate.

10 Claims, 2 Drawing Sheets

ELECTRONIC DEVICE AND CLOCK RATES CONTROLLING METHOD OF OVERCLOCKING OPERATION

CROSS-REFERENCE TO RELATED APPLICATION

This application claims the priority benefit of Taiwan application serial No. 101140581, filed on Nov. 1, 2012. The entirety of the above-mentioned patent application is hereby incorporated by reference herein and made a part of specification.

BACKGROUND OF THE INVENTION

1. Field of the Invention

The invention relates to an over clocking controlling method and, more particularly, to an electronic device and a method for controlling clock rates of an over clocking operation.

2. Description of the Related Art

Since an electronic device needs higher operating voltage in over clocking operation, its temperature easily sharply rises. When the temperature of the electronic device exceeds a threshold temperature scope, the electronic device may be shut down or damaged. Therefore, electronic devices which can adjust the clock rates usually have a built-in automatic under clocking mechanism. The central processing unit (CPU) is taken as an example, when the temperature of the central processing unit is too high due to the longtime over clocking operating, the central processing unit may automatically reduce the clock rates to avoid being shut down or damaged.

However, the clock rates may be not fixed when the central processing unit over clocking operates due to the automatic under clocking mechanism.

BRIEF SUMMARY OF THE INVENTION

An electronic device and a method for controlling clock rates of an over clocking operation are provided, which can adaptively adjust the operating mode according to the temperature of the central processing unit and can effectively control its clock rates when the central processing unit over clocking operates.

An electronic device is provided in an embodiment. The electronic device includes a central processing unit, a temperature sensing element, and a control circuit. The central processing unit is used for over clocking operating. The temperature sensing element is coupled with the central processing unit and used for sensing a temperature of the central processing unit. The control circuit is coupled with the temperature sensing element and the central processing unit and used for determining whether the temperature of the central processing unit is higher than a first threshold temperature. When the temperature of the central processing unit is higher than the first threshold temperature, the control circuit controls the central processing unit to enter an idle mode and determines whether the temperature of the central processing unit is lower than a second threshold temperature. When the central processing unit is at the idle mode and the temperature of the central processing unit is lower than the second threshold temperature, the control circuit controls the central processing unit to return to a normal mode. The first threshold temperature is higher than the second threshold temperature, and clock rates of the central processing unit at the idle mode is equal to the clock rates of the central processing unit at the normal mode.

In an embodiment, the control circuit includes an embedded controller and a chipset. The embedded controller is coupled with the temperature sensing element and used for determining whether the temperature of the central processing unit is higher than the first threshold temperature. The chipset is coupled with the embedded controller and the central processing unit. When the temperature of the central processing unit is higher than the first threshold temperature, the embedded controller sends a pause signal to the chipset, and the chipset controls the central processing unit to enter the idle mode when the chipset receives the pause signal. When the central processing unit is at the idle mode and the temperature of the central processing unit is lower than the second threshold temperature, the embedded controller stops sending the pause signal to the chipset and the chipset controls the central processing unit to return to operate at the normal mode when the chipset does not receive the pause signal.

In an embodiment, the electronic device further includes a triggering element. The triggering element, coupled to the control circuit, is used for receiving an operation instruction and generating a triggering signal according to the operation mode. When the control circuit receives the triggering signal, the control circuit controls the central processing unit to enter the idle mode or return to operate at the normal mode according to the triggering signal.

In an embodiment, the electronic device includes a display. The display is coupled with the control circuit. The control circuit controls the display to display the temperature of the central processing unit.

A method for controlling clock rates of an over clocking operation is provided in an embodiment, which can be applied to an electronic device with an over clocking operating central processing unit. The method includes the following steps: sensing a temperature of the central processing unit; determining whether the temperature of the central processing unit is higher than a first threshold temperature; controlling the central processing unit to enter an idle mode and determining whether the temperature of the central processing unit is lower than a second threshold temperature when the temperature of the central processing unit is higher than the first threshold temperature; and controlling the central processing unit to return to operate at a normal mode when the central processing unit is at the idle mode and the temperature of the central processing unit is lower than the second threshold temperature, wherein, the first threshold temperature is higher than the second threshold temperature, and the clock rates of the central processing unit at the idle mode is equal to the clock rates of the central processing unit at the normal mode.

In an embodiment, the electronic device includes an embedded controller and a chipset. The step of controlling the central processing unit to enter the idle mode includes: the embedded controller sending a pause signal to the chipset; and the chipset controlling the central processing unit to enter the idle mode when the chipset receives the pause signal. The step of controlling the central processing unit to return to operate at the normal mode includes: the embedded controller stopping sending the pause signal to the chipset; and the chipset controlling the central processing unit to return to operate at the normal mode when the chipset does not receive the pause signal.

In an embodiment, the step of controlling the central processing unit to enter the idle mode further includes the step of controlling the chipset to not respond to part or all of the peripheral devices of the electronic device.

In an embodiment, the method for controlling clock rates of the over clocking operation includes the following steps: receiving an operation instruction; generating a triggering signal according to the operation mode; and controlling the central processing unit to enter the idle mode or return to operate at the normal mode according to the triggering signal.

In an embodiment, the method for controlling clock rates of the over clocking operation includes the step of displaying the temperature of the central processing unit at the display of the electronic device or an external display coupled with the electronic device.

The electronic device and the method for controlling clock rates of the over clocking operation can sense the temperature of the central processing unit which over clocking operates and determine whether the temperature of the central processing unit is higher than the first threshold temperature. When the temperature of the central processing unit is higher than the first threshold temperature, the central processing unit is controlled to enter the idle mode and the temperature of the central processing unit is determined whether drops from the first threshold temperature to the second threshold temperature. When the central processing unit is at the idle mode and the temperature of the central processing unit is lower than the second threshold temperature, the central processing unit is controlled to return to operate at the normal mode. Therefore, the embodiment of the invention can effectively fix the clock rates of the over clocking operating central processing unit.

These and other features, aspects and advantages of the present invention will become better understood with regard to the following description, appended claims, and accompanying drawings.

DETAILED DESCRIPTION OF THE EMBODIMENTS

A method for controlling clock rates of an over clocking operation is provided in the embodiments. The method can adaptively switch the operating mode of a central processing unit between an idle mode and a normal mode according to the temperature of the central processing unit when the central processing unit over clocks. For example, when the temperature of the central processing unit is high, the central processing unit can be switched to the idle mode, and pauses part or all of the processes and/or services to have fast heat dissipation. When the temperature of the central processing unit drops to a normal range, the central processing unit can be switched to the normal mode to continue the processes and/or services previous paused due to the high temperature of the central processing unit. Thereby, no matter how the temperature of the central processing unit changes, the clock rates of the central processing unit can be effectively maintained at the over clocking mode.

Furthermore, an electronic device applying the method for controlling clock rates of the over clocking operation is also provided. The features of the present invention will become better understood with regard to the following description, appended claims, and accompanying drawings.

Figure 1:
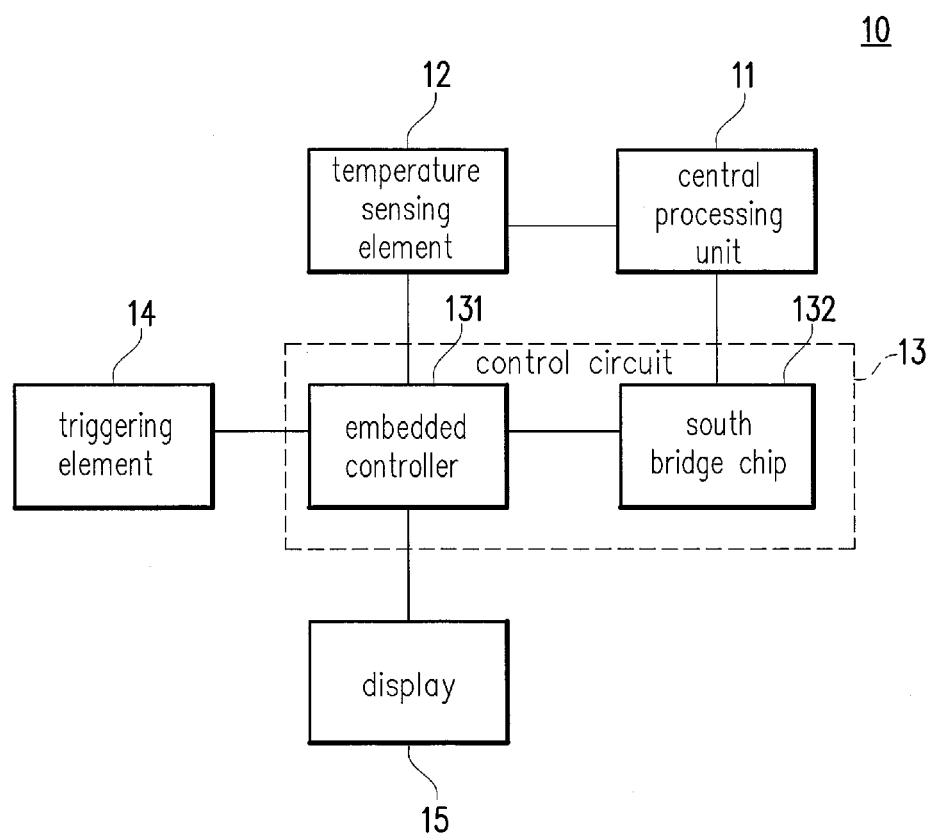
FIG. 1 is a functional block diagram showing an electronic device according to an embodiment of the invention.

FIG. 1 is a functional block diagram showing an electronic device according to an embodiment of the invention. Please refer to FIG. 1. The electronic device 10 can be a tablet computer (PC), a notebook, or a desktop computer.

In the embodiment, the electronic device 10 includes a central processing unit (CPU) 11, a temperature sensing element 12, and a control circuit 13. The central processing unit 11 can run one or more operating systems to execute information data and various kinds of software and/or services.

Users can use various ways to make the central processing unit 11 to over clock to improve the computing efficiency of the central processing unit 11. For example, users can set the clock rates of the central processing unit 11 at the basic input/output system (BIOS) to over clock the central processing unit 11. For example, users can selectively increase the clock rates of the central processing unit 11 from the original setting value 200 MHz to 220 MH, or even higher or lower, which can be set by users.

In the embodiment, since both the clock rates and the operating voltage of the central processing unit 11 are higher than the standard set by the factory when the central processing unit 11 over clocks, the temperature of the central processing unit 11 may easily rise to a value higher than the normal operating temperature. Therefore, by controlling the central processing unit 11 to enter the idle mode, it can effectively dissipate the heat of the central processing unit 11 without change the clock rates of the central processing unit 11. Moreover, the central processing unit 11 can return to operate at the normal mode after the temperature of the central processing unit 11 drops to a normal range.

In other words, in the embodiment, it is supposed that a user improves the clock rates of the central processing unit 11 from original 3.2 GHz to 3.4 GHz (in the over clocking state) and the central processing unit 11 executes an over clocking test program. When the temperature of the central processing unit 11 is too high, the central processing unit 11 does not reduce the clock rates automatically but enters the idle mode to pause the over clocking test program and other programs and/or services. Then, after the temperature of the central processing unit 11 drops to the normal range, the central processing unit 11 returns to operate at the normal mode to continue executing the unfinished over clocking test program and other programs and/or services. Therefore, even if the central processing unit 11 operates in high clock rates longtime, the clock rates of the central processing unit 11 can be effectively fixed (such as 3.4 GHz), which makes the result of the over clocking test program more accurate. The detailed features of the electronic device 10 are described below.

The temperature sensing element 12 is coupled with the central processing unit 11 and used for sensing the temperature of the central processing unit 11. The control circuit 13 is coupled with the central processing unit 11 and the temperature sensing element 12 and used for determining whether the temperature of the central processing unit 11 is higher than a threshold temperature (which is called a first threshold temperature hereinafter) according to the temperature value sensed by the temperature sensing element 12. Since the first threshold temperature (such as 90° C.) is used for determining whether the temperature of the central processing unit 11 is higher than the threshold temperature that the clock rates of the central processing unit 11 should be automatically reduced, the first threshold temperature could be adaptively adjusted according to the different specifications, models, or brands of the different central processing units. Moreover, the first threshold temperature also can be adjusted according to the practical demands based on the design and practical consideration.

When the temperature of the central processing unit 11 reaches the first threshold temperature, it means that the temperature of the central processing unit 11 reaches the temperature that the clock rates of the central processing unit 11 should be automatically reduced. The control circuit 13 controls the central processing unit 11 to enter the idle mode to avoid that the central processing unit 11 automatically reduce its the clock rates. The central processing unit 11 pause executing part or all of the programs and/or services, which is similar to be at a disable mode. The high temperature of the central processing unit 11 is mainly caused by that the central processing unit 11 executes too many programs and/or services in high clock rates (or in high voltage). Therefore, the central processing unit 11 in the embodiment can enter the idle mode to lighten loading to reduce the temperature of the central processing unit 11 instead of conventionally reducing the operating voltage and/or clock rates to reduce the temperature of the central processing unit 11.

In the embodiment, the control circuit 13 can includes an embedded controller 131 and a chipset (ex, south bridge) 132. The embedded controller 131 is coupled with the temperature sensing element 12, and the chipset 132 is coupled with the embedded controller 131 and the central processing unit 11. The embedded controller 131 may be used for determining whether the temperature of the central processing unit 11 reaches the first threshold temperature. When the embedded controller 131 determines that the temperature of the central processing unit 11 reaches the first threshold temperature, the embedded controller 131 immediately sends a pause signal to the chipset 132. When the chipset 132 receives the pause signal, the chipset 132 controls the central processing unit 11 to enter the idle mode.

The chipset 132 in the embodiment is used for controlling the central processing unit 11 to enter the idle mode. More detailed features are showed referring to the discretion below.

In the embodiment, the pause signal may be a system control interrupt signal. For example, when the temperature of the central processing unit 11 is lower than the first threshold temperature (that is a normal state), the embedded controller 131 can send the system control interrupt signal, whose value is "1", to the chipset 132. When the chipset 132 receives the system control interrupt signal whose value is "1", the chipset 132 can send corresponding control instructions to the central processing unit 11 to control the central processing unit 11 to execute scheduled programs or services according the system control interrupt signal. In other words, the central processing unit 11 operates at the normal mode.

When the embedded controller 131 determines the temperature of the central processing unit 11 reaches or is higher than the first threshold temperature, the embedded controller 131 changes to send the system control interrupt signal whose value is "0" (the pause signal) to the chipset 132. When the chipset 132 receives the system control interrupt signal whose value is "0" (the pause signal), the chipset 132 may temporarily stop sending any control instruction to the central processing unit 11 according to the system control interrupt signal (the pause signal). In other words, since the central processing unit 11 operates according to the control instructions of the chipset 132, the central processing unit 11 does not execute any program or service if the chipset 132 does not send control instructions to the central processing unit 11. The central processing unit 11 enters the idle mode at the time. The clock rates is not changed and maintained at the same clock rates (for example, the clock rates is 3.4 GHz) when the central processing unit 11 enters the idle mode.

The pause signal also may be sent by a basic input/output system in the control circuit 13. For example, when the embedded controller 131 determines the temperature of the central processing unit 11 is higher than the first threshold temperature, the embedded controller 131 can inform the basic input/output system to send the pause signal via the basic input/output system.

Furthermore, in an embodiment, when the chipset 132 receives the pause signal, the chipset 132 is also at a similar disable mode but not sending control instructions to the central processing unit 11. The chipset 132 does not respond or send signal to part or all of the peripheral devices of the electronic device 10. The peripheral device of the electronic device 10 may be various kinds of buses, chipsets, and/or interface cards, wherein the buses include universal serial buses, peripheral component interconnect buses, PCI express, and/or PCIE bus and so on. The chipsets can include north bridge chipsets, graphic cards, and/or sound cards and so on. Moreover, the interface cards can include wired LAN cards and/or wireless LAN cards, etc., which is not limited herein.

After the control circuit 13 switches the central processing unit 11 to the idle mode, the control circuit 13 persistently receives the data of the temperature of the central processing unit 11 and determines whether the temperature of the central processing unit 11 drops to or is lower than another threshold temperature (the second threshold temperature). In the embodiment, for example, the second threshold temperature is 50° C., which can be adjusted according to the design or practical demands.

When the temperature of the central processing unit 11 drops to or is lower than the second threshold temperature, it means that the temperature of the central processing unit 11 is in the normal range and the central processing unit 11 can continue executing the unfinished or paused programs and/or services. In other words, when the central processing unit 11 is at the idle mode and the temperature of the central processing unit 11 drops to or is lower than the second threshold temperature, the control circuit 11 can control the central processing unit 11 to return to operate at the normal mode.

The first threshold temperature mentioned in the embodiment is used for determining whether the central processing unit 11 should be controlled to enter the idle mode, meanwhile, the second threshold temperature is used for determining whether the central processing unit 11 should be controlled to enter the normal mode, therefore, the threshold temperature is higher than the second threshold temperature. The clock rate of the central processing unit 11 at the idle mode is substantially equal to the clock rates of the central processing unit 11 at the normal mode.

In another embodiment, users can manually control the central processing unit 11 to enter the idle mode at any time. For example, in an embodiment, the electronic device 10 may include a triggering element 14 coupled with the control circuit 11. The triggering element 14 may be a physical button to receive user's operation to generate a trigger signal. When the control circuit 11 receives the triggering signal, the control circuit 11 controls the central processing unit 13 to enter the idle mode or return to operate at the normal mode according to the triggering signal, which is determined by the operating state of the central processing unit 11 or the pressing state of the triggering element 14.

If the central processing unit 11 is at the normal mode and the triggering element 14 is pressed to be at a subsidence state, the triggering element 14 persistently sends the triggering signal to the embedded controller 131. When the embedded controller 131 receives the triggering signal, it sends the pause signal to the chipset 132 and the chipset 132 controls the central processing unit 11 to enter the idle mode, the control way is not described for a concise purpose. When the user no longer presses the triggering element 14, the triggering element 14 stops sending the triggering signal to the embedded controller 131, and the central processing unit 11 returns to operate at the normal mode.

However, it is not limited herein. For example, in another embodiment, the electronic device 10 can further include a display 15 coupled with the control circuit 13. The display 15 can be an external display connected with the electronic device 10 or a display of the electronic device 10. Therefore, the control circuit 13 can control the display 15 to display the temperature of the central processing unit 131. For example, the embedded controller 131 controls the display 15 to display the temperature value sensed by the temperature sensing element 12 for users.

Figure 2:
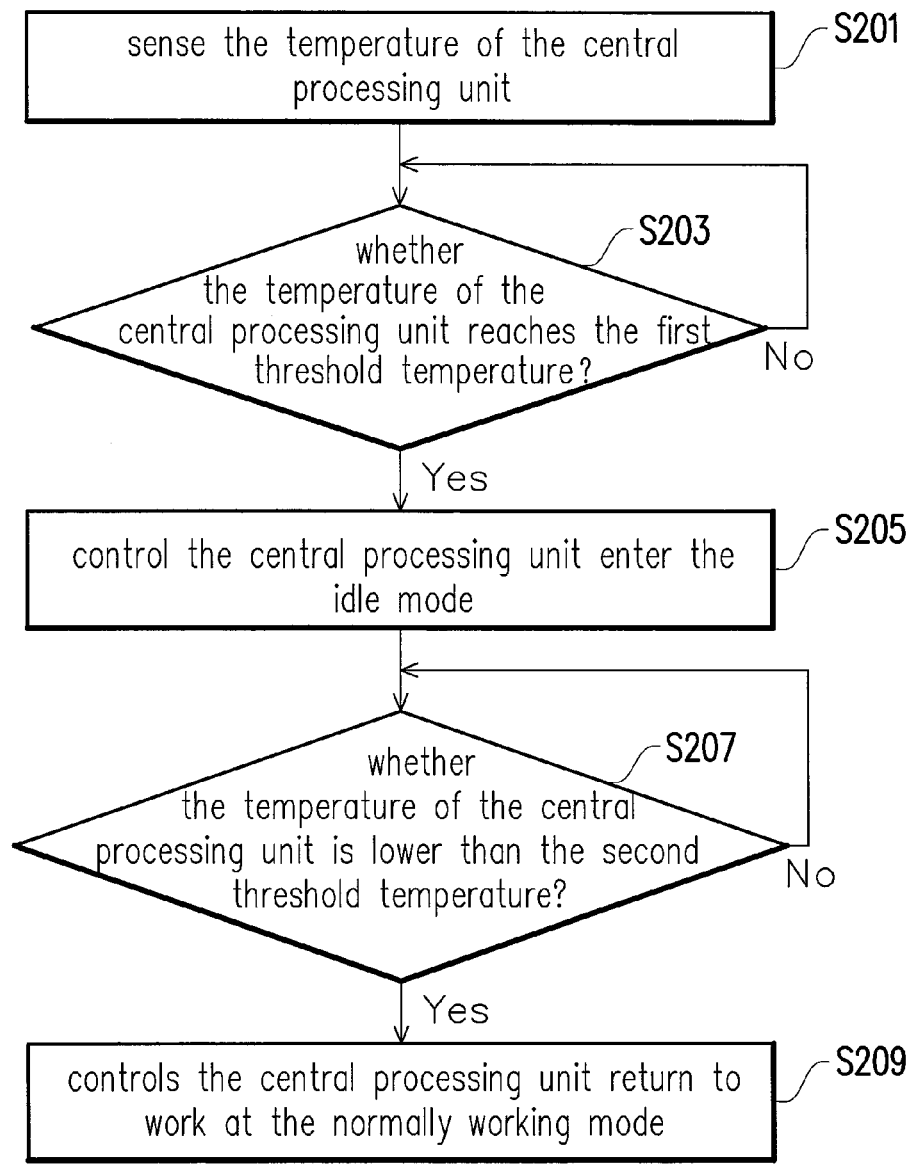
FIG. 2 is a schematic flowchart diagram showing a method for controlling clock rates of an over clocking operation.

FIG. 2 is a schematic flowchart diagram showing a method for controlling clock rates of an over clocking operation. Please refer to FIG. 1 and FIG. 2. It is supposed that the central processing unit 11 of the electronic device 10 over clocking operates (for example, the clock rates is improved from 3.2 GHz to 3.4 GHz). In step S201, the temperature sensing element 12 senses the temperature of the central processing unit 11. In step S203, The control circuit 13 determines whether the temperature of the central processing unit 11 is higher than the first threshold temperature (such as 90° C.).

When the control circuit 13 determines the temperature of the central processing unit 11 is higher than the first threshold temperature (such as 90° C.), the control circuit 13 controls the central processing unit 11 to enter the idle mode in step S205. In step S207, the control circuit 13 determines whether the temperature of the central processing unit 11 drops to or is lower than the second threshold temperature (such as 50° C.). When the temperature of the central processing unit 11 drops from the first threshold temperature to, or even lower than, the second threshold temperature (such as 50° C.), the control circuit 13 controls the central processing unit 11 to return to operate at the normal mode in step S209. In the embodiment, the clock rates of the central processing unit 11 at the idle mode is the same to that at the normal mode.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
    a central processing unit (CPU) used for over clocking operating;
    a temperature sensing element coupled with the central processing unit and used for sensing a temperature of the central processing unit operated in an over-clocked state wherein a clock rate of the over-clocked state is higher than a normal clock rate; and
    a control circuit coupled with the temperature sensing element and the central processing unit and configured to control the central processing unit to enter an idle mode when the temperature of the central processing unit operated in the over-clocked state is higher than a first threshold temperature,
    wherein the control circuit is further configured to control the control processing unit to return to a normal mode when the central processing unit is at the idle mode and the temperature of the central processing unit is lower than a second threshold temperature,
    wherein the first threshold temperature is higher than the second threshold temperature, and a clock rate of the central processing unit at the idle mode is the clock rate of the over-clocked state and equal to a clock rate of the central processing unit at the normal mode.

2. The electronic device according to claim 1, wherein the control circuit comprises:
    an embedded controller, coupled with the temperature sensing element and used for determining whether the temperature of the central processing unit is higher than the first threshold temperature; and
    a chipset coupled with the embedded controller and the central processing unit,
    wherein when the temperature of the central processing unit is higher than the first threshold temperature, the embedded controller sends a pause signal to the chipset, and the chipset controls the central processing unit to enter the idle mode when the chipset receives the pause signal,
    when the central processing unit is at the idle mode and the temperature of the central processing unit is lower than the second threshold temperature, the embedded controller stops sending the pause signal to the chipset, and the chipset controls the central processing unit to return to operate at the normal mode when the chipset does not receive the pause signal.

3. The electronic device according to claim 2, wherein the chipset does not respond to part or all of peripheral devices of the electronic device when the chipset receives the pause signal.

4. The electronic device according to claim 1, further comprising:
    a triggering element coupled to the control circuit and used for receiving an operation instruction and generating a triggering signal according to the operation mode,
    wherein when the control circuit receives the triggering signal, the control circuit controls the central processing unit to enter the idle mode or return to operate at the normal mode according to the triggering signal.

5. The electronic device according to claim 1, further comprising:
    a display coupled with the control circuit,
    wherein the control circuit controls the display to display the temperature of the central processing unit.

6. A method for controlling an over clocking operation, applied to an electronic device with a central processing unit, wherein the CPU over clocking operates, the method comprising:
    sensing a temperature of the central processing unit operated in an over-clocked state, wherein a clock rate of the over-clocked state is higher than a normal clock rate;
    controlling the central processing unit to enter an idle mode when the temperature of the central processing unit operated in the over-clocked state is higher than a first threshold temperature; and
    controlling the central processing unit to return to operate at a normal mode when the central processing unit is at the idle mode and the temperature of the central processing unit is lower than a second threshold temperature,
    wherein the first threshold temperature is higher than the second threshold temperature and a clock rate of the central processing unit at the idle mode is the clock rate of the over-clocked state and equal to a clock rate of the central processing unit at the normal mode.

7. The method for controlling an over clocking operation according to claim 6, wherein the electronic device includes an embedded controller and a chipset, and the step of controlling the central processing unit to enter the idle mode comprises:
  sending a pause signal to the chipset by the embedded controller; and
  controlling the central processing unit to enter the idle mode by the chipset when the chipset receives the pause signal,
  wherein the step of controlling the central processing unit to return to operate at the normal mode comprises:
  stopping sending the pause signal to the chipset by the embedded controller; and
  controlling the central processing unit to return to operate at the normal mode by the chipset when the chipset does not receive the pause signal.

8. The method for controlling an over clocking operation according to claim 7, wherein the step of controlling the central processing unit to enter the idle mode further comprises:
  controlling the chipset to not respond to part or all of the peripheral devices of the electronic device.

9. The method for controlling an over clocking operation according to claim 6, further comprising:
  receiving an operation instruction;
  generating a triggering signal according to the operation mode; and
  controlling the central processing unit to enter the idle mode or return to operate at the normal mode according to the triggering signal.

10. The method for controlling an over clocking operation according to claim 6, further comprising:
  displaying the temperature of the central processing unit at the display of the electronic device or an external display coupled with the electronic device.

* * * * *